Patented Jan. 19, 1937

2,068,353

UNITED STATES PATENT OFFICE 2,068,353

ARYLAZODIAMINO-PICOLINES

Herman J. Schneiderwirth, Laurelton, N. Y., assignor to Picochrome Corporation, Jamaica, N. Y., a corporation of New York No Drawing. Application December 24, 1935, Serial No. 56,085

6 Claims. (Cl. 260—42)

My invention relates to chemical compounds and refers particularly to those compounds produced by combining diazotized aryl-amino compounds with diamino-alpha-picoline in which one amino group is in the 6 position.

I have found that, if a diazotized aryl-amino compound be coupled or combined with a diamino-alpha-picoline in which one amino group is in the 6 position, there are formed compounds, many of which have valuable dyeing properties or possess valuable pharmaceutical properties, being antibacterial and anesthetic without toxic and irritating effects and, hence, are valuable medicinal agents capable of internal or external use.

Among the aryl-amino compounds found suitable for use in the formation of the compounds of my invention are the amino compounds of benzene, pyridine, naphthalene, anthracene, their esters, homologues, and substituted compounds.

Among the diamino-alpha-picolines found suitable in the formation of the compounds of my invention are 3.6-diamino-alpha-picoline and 4.6-diamino-alpha-picoline.

The compounds of my invention have the following formula:

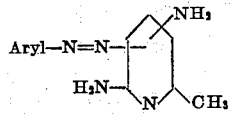

in which the second amino group is either in the third or fourth position.

I have found that the 3.6-diamino-alpha-picoline and 4.6-diamino-alpha-picoline can be obtained when alpha-picoline is gradually heated with sodamide or metallic sodium and ammonia gas to a temperature between 200° C. and 300° C. and maintained between these temperatures for several hours. Alpha-picoline and sodamide react upon each other with liberation of hydrogen resulting in the formation of diamino-alpha-picoline after water has been added to the reaction mixture.

I have found that the raw crystalline cake obtained in the following of the above-described process consists of a mixture of 3.6-diamino-alpha-picoline and 4.6-diamino-alpha-picoline present in different proportions depending upon the specific method of carrying out the process with regard to temperature, time, and control of the reaction between 200° C. and 300° C. The so-obtained diamino-alpha-picolines are separated from each other by recrystallization in different amounts of organic solvents such as benzene, toluene, and others or by fractional vacuum distillation.

Both compounds form light, shiny crystalline plates which dissolve easily in water with an alkaline reaction. They have different melting points and form different chemical products when treated identically.

The chemical structures of these two diamino-alpha-picolines are as follows:

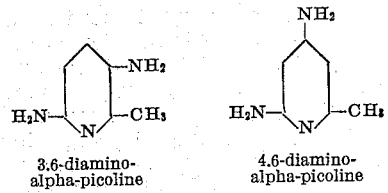

3.6-diamino-alpha-picoline        4.6-diamino-alpha-picoline

I have found that both of these new diamino-alpha-picolines form previously unknown azo dyes by coupling them with diazotized members of the aromatic series and their substituted products, usually referred to as "aryls" when forming part of a chemical molecule.

I have obtained a large number of such azo dyes, the general chemical structures of which are as follows:

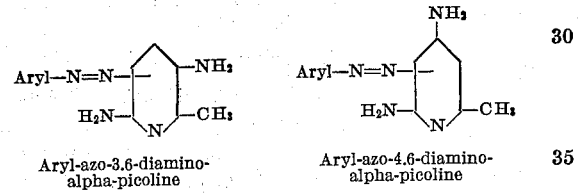

Aryl-azo-3.6-diamino-alpha-picoline        Aryl-azo-4.6-diamino-alpha-picoline

I give the following as examples of the carrying out of my invention:

EXAMPLE 1

Ortho-cresyl-azo-3.6-diamino-alpha-picoline 100 grams of 5-amino-ortho-cresol are dissolved in 1200 c. c. of water or methyl alcohol with the addition of 500 c. c. of hydrochloric acid S. G. 1.19. The solution is cooled with ice, or otherwise, to about 5° C. and a solution of 80 grams of sodium nitrite in 300 c. c. of water is added gradually with constant stirring until the diazotation is completed. This solution is added to an aqueous solution of 95 grams of 3.6-diamino-alpha-picoline to which hydrochloric acid has been added. A red solution of a dye forms at once and after several hours the mixture is heated to about 60° C. and, after cooling to about 40° C., a concentrated, aqueous solution of sodium acetate is added until a slight acid reaction is maintained. When cooled on ice, or otherwise, the hydrochloric acid salt of the dye, namely ortho-cresyl-azo-3.6-diamino-alpha-picoline, separates, which is filtered off, washed with water, and dried. The product forms a dark crystalline powder soluble in water with a dark red color. It has a slight acid reaction and, when a small amount of ammonia is added to the solution, a dark brown precipitate is formed which melts at about 143° C. Hydrochloric acid redissolves this base forming the originally separated hydrochloride. The product is soluble in water, glycerine, ethyl glycol, alcohol, acetone, and is insoluble in benzene, toluene, chloroform, and ether.

In the same manner, the meta and para amino cresols can be combined with 3.6-diamino-alpha-picoline resulting in the formation of other azo dyes.

Example 2

*Ortho-cresyl-azo-4.6-diamino-alpha-picoline*

100 grams of 5-amino-ortho-cresol are dissolved in 1200 c. c. of water containing 20 per cent methyl alcohol and 500 c. c. of hydrochloric acid is added and the amino-ortho-cresol is diazotized by means of a solution of 80 grams of sodium nitrite in about 300 c. c. of water at a temperature of about 5° C. 90 grams of 4.6-diamino-alpha-picoline are dissolved in water with 20 c. c. of hydrochloric acid and this solution is added to the above-mentioned solution of the diazotized compound. After standing several hours, the dark red solution of the dye thus formed is heated to about 60° C. and, after cooling, a sodium acetate solution is added and a slight acid reaction is obtained. When cooled on ice, a black crystalline powder separates in the solution, which consists of the hydrochloride of cresyl-azo-4.6-diamino-alpha-picoline. This dye possesses characteristics similar to that described in Example 1 but is, however, less soluble in cold water. Its base has a melting point of about 177° C. When the base is precipitated with dilute ammonia, a slight excess of the ammonia redissolves the base into a dark yellow color. The dried base of this compound has a lighter brown color than the base of the dye in Example 1.

Example 3

*Para-methoxy-phenyl-azo-3.6-diamino-alpha-picoline*

100 grams of para-anisidine are dissolved in 500 c. c. of water and 300 c. c. of hydrochloric acid S. G. 1.19 are added. The solution is cooled on ice to about 5° C. and, gradually and slowly while stirring, a solution of 80 grams of sodium nitrite in 300 c. c. of water is added until the diazotization is completed. A solution of 95 grams of 4.6-diamino-2-picoline in water, to which hydrochloric acid has been added, is mixed with the diazotized compound and after several hours standing the liquid is heated on a waterbath to about 60° C. After cooling to below 40° C. a concentrated water solution of sodium acetate is added until the reaction is slightly acid. After cooling on ice for several hours, the hydrochloride of the azo dye, para-methoxyphenyl-azo-3.6-diamino-alpha-picoline, crystallized out and is separated, purified, and dried. The compound consists of shiny dark small crystals having a greenish tint. Addition of small amounts of ammonia or alkali separates the base, which has a light brown color and a melting point of 155° C. In a similar way, using methyl alcohol as a solvent, the ortho and meta compounds are obtained. The water solutions of the dyes show a dark yellowish red color.

Example 4

*Phenyl-azo-4.6-diamino-alpha-picoline*

180 grams of freshly distilled aniline is dissolved in a mixture of 190 c. c. of concentrated sulfuric acid and 1200 c. c. of water. After cooling to about 5° C. and after the addition of about 200 grams of ice to the mixture, a solution of 150 grams of sodium nitrite in 600 c. c. of water is added gradually with constant stirring until the diazotization of the aniline is complete. A solution of 175 grams of 4.6-diamino-alpha-picoline in 3,000 c. c. of water and 35 c. c. of sulfuric acid is added to the above solution of the diazotized compound and, after standing for several hours and then heating to about 60° C., a concentrated sodium acetate solution is added until the solution of the dye thus produced reacts slightly acid. The sulphuric acid salt of phenyl-azo - 4.6 - diamino - alpha - picoline crystallizes out after being cooled in the form of dark, shiny crystals soluble in water with a dark orange color. Ammonia separates a brown base from this solution which has a melting point of 182° C.

The foregoing examples are not to be considered as limitations to the breadth of my invention as other amino members of the aromatic series can be employed for the production of valuable dyes, nor do I limit myself to the particular times, temperatures, or steps of procedure specifically set forth in my specification as the essence of my invention is the formation of new and valuable azo dyes from the previously unknown 3.6-diamino-alpha-picoline and 4.6-diamino-alpha-picoline.

What I claim is:

1. Chemical compounds having the following formula:

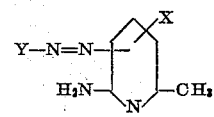

in which X represents NH₂ in either the third or fourth position of the ring and Y represents the radical of a diazotized amino-cresol having antibacterial and anesthetic properties.

2. Chemical compounds having the following formula:

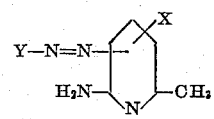

in which X represents NH₂ in either the third or fourth position of the ring and Y represents the radical of 5-amino-ortho-cresol having antibacterial and anesthetic properties.

3. Chemical compounds having the following formula:

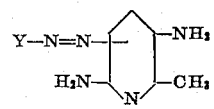

in which Y represents the radical of a diazotized amino-cresol having antibacterial and anesthetic properties.

4. Chemical compounds having the following formula:

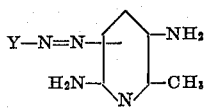

in which Y represents the radical of a diazotized 5-amino-ortho-cresol having antibacterial and anesthetic properties.

5. Chemical compounds having the following formula:

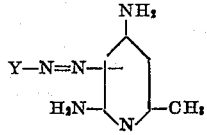

in which Y is the radical of a diazotized aminocresol having antibacterial and anesthetic properties.

6. Chemical compounds having the following formula:

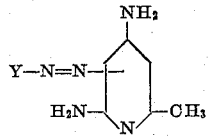

in which Y is the radical of a diazotized 5-amino-ortho-cresol having antibacterial and anesthetic properties.

HERMAN J. SCHNEIDERWIRTH.